(12) United States Patent
Donnelly

(10) Patent No.: US 10,480,705 B2
(45) Date of Patent: Nov. 19, 2019

(54) HEATSHIELD FOR A BAND CLAMP

(71) Applicant: Ford Global Technologies, LLC, Dearborn, MI (US)

(72) Inventor: James Donnelly, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/872,661

(22) Filed: Jan. 16, 2018

(65) Prior Publication Data

US 2018/0224054 A1    Aug. 9, 2018

(30) Foreign Application Priority Data

Feb. 6, 2017    (GB) .................................. 1701956.3

(51) Int. Cl.
| F16L 59/18 | (2006.01) |
|---|---|
| B25B 5/16 | (2006.01) |
| F16L 23/08 | (2006.01) |
| F16L 21/06 | (2006.01) |

(52) U.S. Cl.
CPC .............. F16L 59/182 (2013.01); B25B 5/16 (2013.01); F16L 59/184 (2013.01); *F16L 21/065* (2013.01); *F16L 23/08* (2013.01)

(58) Field of Classification Search
CPC ......... F16L 57/00; F16L 59/182; F16L 57/04; F16L 59/18; F16L 59/184
See application file for complete search history.

(56) References Cited

U.S. PATENT DOCUMENTS

| 4,099,749 A * | 7/1978 | van Vliet | ............... F16L 21/002 |
|---|---|---|---|
| | | | 285/398 |
| 2015/0008663 A1 | 1/2015 | Drivon et al. | |
| 2015/0235821 A1 | 8/2015 | Madocks et al. | |
| 2017/0292643 A1 * | 10/2017 | Prevot | ................... F16L 59/184 |

FOREIGN PATENT DOCUMENTS

| CN | 2297580 Y | 11/1998 |
|---|---|---|
| CN | 202161220 U | 3/2012 |
| CN | 202927375 U | 5/2013 |
| CN | 105179396 A | 12/2015 |
| DE | 202016002955 U1 | 7/2016 |
| EP | 2113699 A1 | 11/2009 |
| EP | 2549168 A1 | 1/2013 |
| WO | 2008002129 A2 | 1/2008 |

OTHER PUBLICATIONS

European Patent Office, Extended European Search Report Issued in Application No. 18150155.2, dated Jul. 2, 2018, Germany, 7 pages.
Intellectual Property Office of the United Kingdom, Combined Search and Examination Report Issued in Application No. GB1701956.3, dated May 31, 2017, South Wales, 7 pages.

* cited by examiner

*Primary Examiner* — Robert Sandy
*Assistant Examiner* — Michael S Lee
(74) *Attorney, Agent, or Firm* — Geoffrey Brumbaugh; McCoy Russell LLP (57) ABSTRACT

A heatshield for a band clamp, the heatshield having: an attachment member configured to be inserted axially into the clamp; and a thermal insulator secured to the attachment member, the thermal insulator being configured to at least partially extend over an outer surface of the clamp when the attachment member is inserted into the clamp.

15 Claims, 4 Drawing Sheets

HEATSHIELD FOR A BAND CLAMP

CROSS REFERENCE TO RELATED APPLICATION

The present application claims priority to Great Britain Patent Application No. 1701956.3, entitled "Heatshield for a Band Clamp", filed Feb. 6, 2017. The entire contents of the above-referenced application are hereby incorporated by reference in its entirety for all purposes.

Introduction

This disclosure relates to a heatshield configured for use with a band clamp, and in particular, but not exclusively, relates to a heatshield that may be retro-fitted to an existing band clamp.

It is common to use a clamp, such as a band clamp, to secure two portions of ducting to each other. For example, when connecting a turbocharger to an inlet/outlet pipe, a "V-shaped" band clamp may be used to secure a flange on the turbocharger to a flange on the intake/exhaust pipe.

Where a band clamp is used to secure a pipe to the outlet of the turbocharger, the clamp can become hot, due to the transfer of heat from the turbocharger outlet gas. In order to protect the surrounding components from heat radiating from the clamp, a heatshield may be required. While it is known to attach a heatshield to a clamp, doing so can add cost to the clamp, and in some cases can limit the functionality of the components surrounding the clamp, and the clamp itself.

Statements of Invention

According to an aspect of the present disclosure there is provided a heatshield for a clamp, for example a band clamp, the heatshield comprising: an attachment member configured to be inserted axially into the clamp; and a thermal insulator secured to the attachment member, the thermal insulator being configured to at least partially extend over an outer surface of the clamp when the attachment member is inserted into the clamp.

The attachment member may be inserted axially into an opening of the clamp that is defined by a band of the clamp. In this manner, the attachment member may be disposed radially inside the band of the clamp when the attachment member is inserted into the clamp.

The attachment member may be configured to engage coaxially a radially inner surface of the clamp, for example a clamping surface of the clamp. The attachment member may comprise a load transfer portion configured to transfer a clamp load of the clamp when the heatshield is inserted into the clamp. The load transfer portion of the attachment member may be configured to engage conformally the radially inner surface of the clamp.

The attachment member may comprise a connecting portion that extends away from the clamp when the attachment member is inserted into the clamp. For example, the load transfer portion and the connecting portion of the attachment member may be adjoined such that when the load transfer portion is inserted into the clamp, the connecting portion extends away from the interface between the load transfer portion and the radially inner surface of the clamp.

The thermal insulator may comprise at least one of a woven material, a ceramic material and a metallic material. The thermal insulator may be attached to the connecting portion of the attachment member using any appropriate attachment means. For example, where the thermal insulator comprises a woven/knitted material, the thermal insulator may be stitched/tied to the attachment member. Where the thermal insulator comprises a metallic material, the thermal insulator may be welded to the attachment member.

The attachment member may comprise one or more openings arranged circumferentially around the periphery of the attachment member. The thermal insulator may be secured to the attachment member by virtue of the one or more openings. For example, where the thermal insulator comprises a woven/knitted material, the thermal insulator may be stitched/tied to the openings arranged circumferentially around the periphery of the attachment member.

The attachment member may be configured to be inserted into the clamp by a predetermined distance. The predetermined distance may be a derived from the axial length of the clamp. For example, the predetermined distance may be less than half of the axial length of the clamp, so as not to engage a union between the components that the clamp secures together. The attachment member may be configured to limit the amount by which the attachment member may be inserted in to the clamp. The attachment member may be configured to engage an axial end face of the clamp. The attachment member may be configured to engage a flange of a turbocharger or a duct member.

The heatshield may comprise a first attachment member configured to be inserted axially into the band clamp in a first direction. The heatshield may comprise a second attachment member configured to be inserted axially into the band clamp in a second direction. The first direction may be opposite to the second direction. The first attachment member may be configured to engage a first axial end face of the clamp. The second attachment member may be configured to engage a second axial end face of the clamp. The first attachment member may have a different form to the second attachment member, for example depending on the configuration of the clamp.

The thermal insulator may be connected to the first attachment member and the second attachment member. The thermal insulation may extend circumferentially around the clamp when the attachment member is inserted into the clamp. The thermal insulation may extend partially around the circumference of the clamp when the attachment member is inserted into the clamp.

The heatshield may be configured to be secured to the clamp by the clamping force of the clamp in an installed configuration.

The attachment member may comprise a sealing feature, such as a gasket. The sealing feature may be provided on the attachment member so that it is disposed inside the clamp when the attachment member is inserted into the clamp. For example, the sealing feature may be configured to provide a seal between the clamping surface of the clamp and a component to which the clamp is attached, e.g. a duct and/or an outlet of a turbo charger. The sealing feature may be provided on or adjacent to the load transfer portion of the attachment member, so that a clamp load of the clamp acts to compress the sealing feature to provide a seal between the clamping surface of the clamp and a component to which the clamp is attached. The sealing feature may extend circumferentially around the inside of the band clamp in an installed configuration. For example, when the attachment member is inserted into the clamp, the sealing feature may be configured to engage circumferentially the clamping surface of the clamp and a component to which the clamp is attached. The sealing feature may be formed from a resilient material, such as rubber.

According to another aspect of the present disclosure there is provided a band clamp assembly comprising: a band clamp; and a heatshield comprising: an attachment member configured to be inserted axially into the clamp; and a thermal insulator secured to the attachment member, the thermal insulator being configured to at least partially extend over an outer surface of the clamp when the attachment member is inserted into the clamp.

An engine or vehicle may be provided comprising one or more of the above mentioned heatshields and/or band clamp assemblies.

According to another aspect of the present disclosure there is provided a kit of band clamp components, the kit comprising: one or more band clamps; and a plurality of heatshields each comprising: an attachment member configured to be inserted axially into the clamp; and a thermal insulator secured to the attachment member, the thermal insulator being configured to at least partially extend over an outer surface of the clamp when the attachment member is inserted into the clamp, wherein the thermal insulating capability of the first heatshield is different to the thermal insulating capability of the second heatshield.

According to another aspect of the present disclosure there is provided a method of securing a heatshield to a band clamp, the heatshield comprising: an attachment member configured to be inserted axially into the clamp; and a thermal insulator secured to the attachment member, the thermal insulator being configured to at least partially extend over an outer surface of the clamp when the attachment member is inserted into the clamp, the method comprising: inserting axially the attachment member into the clamp; and tightening the clamp to secure the heatshield in place by virtue of a clamp load of the clamp.

In the context of the present disclosure, the term "under", or "underneath", when used in relation to a clamp is to be understood as a position in which an article may be clamped by the clamp. For example, an article may be "under" a band clamp when the article is located radially inside of the band clamp so that the article is clamped in position upon tightening the band clamp.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

It is common to use a band clamp to secure together two pieces of ducting. For example, an automotive manufacturer may use many types of band clamps to assemble together various components of a vehicle. In particular, a V-shaped band clamp may be used to secure an outlet pipe to the outlet of a turbocharger of an engine. This type of band clamp comprises a discontinuous band which is formed into an annulus and is substantially V-shaped in cross section. The free ends of the band are coupled together using fastening means, which can be used to adjust the circumferential length of the band clamp. For example, each of the free ends of the band may be folded radially outwardly and be provided with an opening configured to receive fastening, such as a nut and bolt. However, the free ends of the band may be joined together using any appropriate fastening means. As a result of the high temperature of the gas output from the turbocharger, the clamp itself can become extremely hot, which may lead to degradation of one or more components proximate to the clamp.

The present disclosure provides a heatshield configured to thermally protect components that may be close to a clamp attached to the outlet of a turbocharger. In particular, the present disclosure is advantageous as it provides a heatshield that can be retro-fitted to existing clamps for the purpose of reducing the amount of heat transferred from the clamp to the environment surrounding the clamp. However, while the present disclosure makes particular reference to a band clamp configured to secure an outlet pipe to a turbocharger outlet, the present disclosure may be used in any appropriate situation where it is desirable to reduce the amount of heat transferred to the environment surrounding a band clamp used for high temperature applications.

Figure 1A:
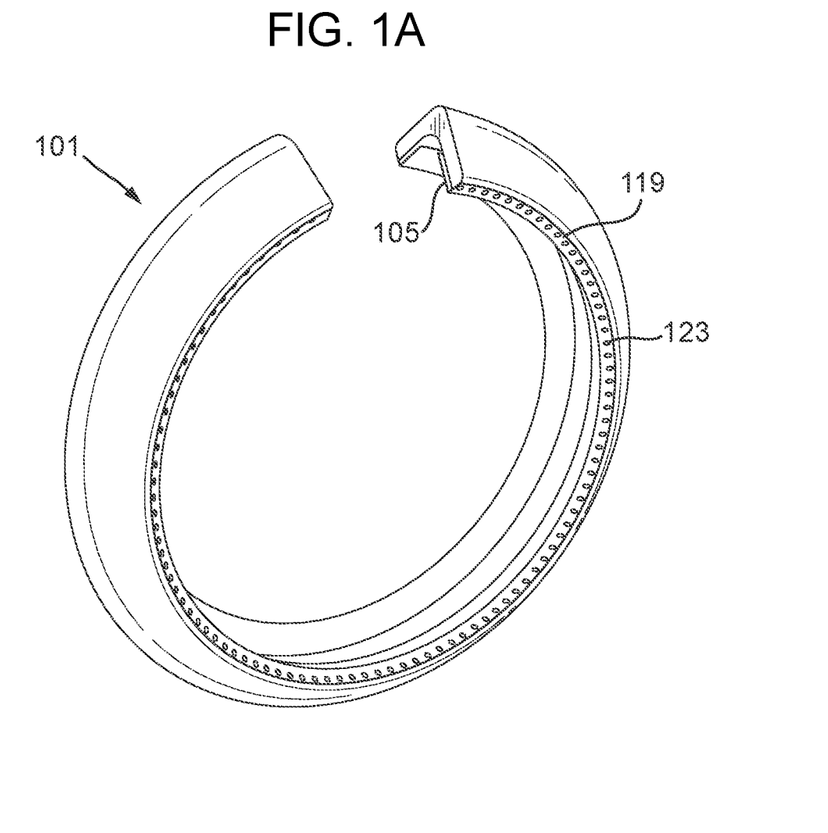
FIG. 1A shows a heatshield for a clamp.
Figure 1B:
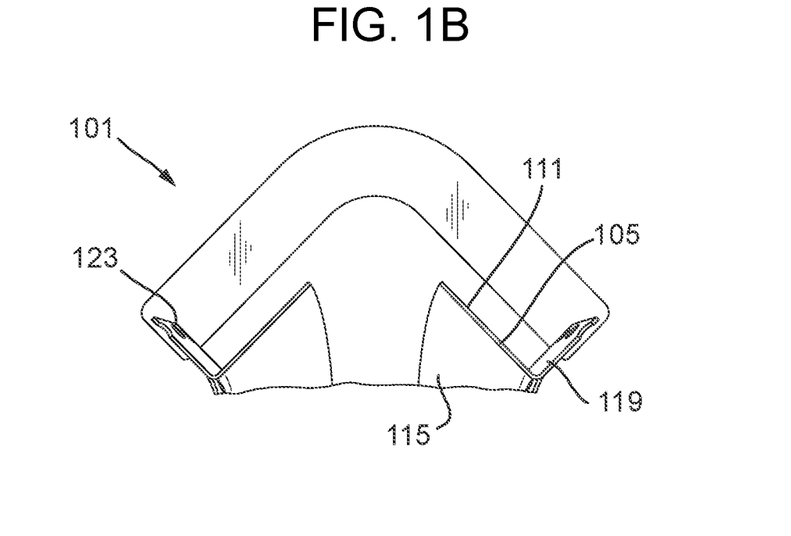
FIG. 1B shows a cross section through the heatshield of FIG. 1A.
Figure 2A:
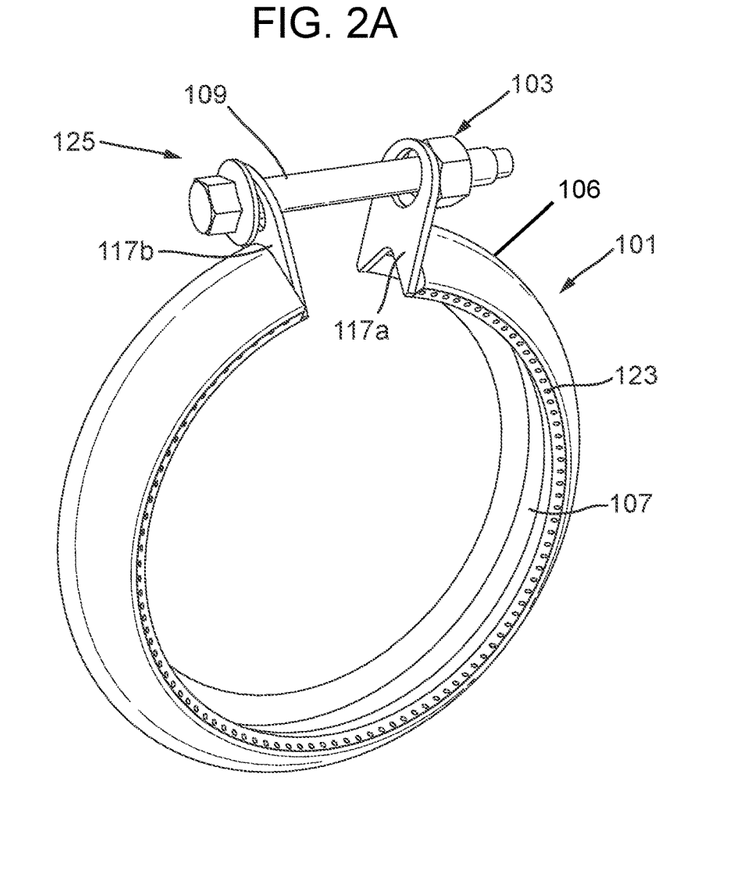
FIG. 2A shows a clamp assembly.
Figure 2B:
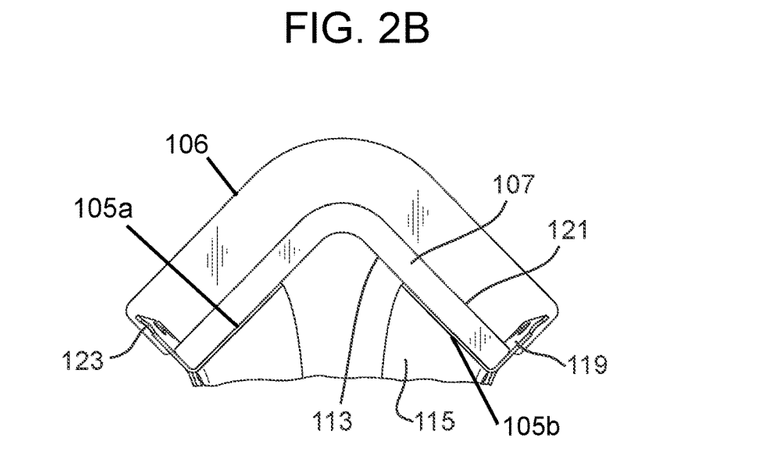
FIG. 2B shows a cross section through the clamp assembly of FIG. 2A.

FIGS. 1A and 1B show an arrangement of a heatshield 101 configured to be installed to a V-shaped band clamp 103, and FIGS. 2A and 2B show the heatshield 101 installed to the V-shaped band clamp 103. However, the heatshield 101 may be configured to be installed to any appropriate type of clamp.

The heatshield 101 comprises an attachment member 105, which is configured to couple the heatshield 101 to the clamp 103, and a thermal insulator 106 secured to the attachment member 105, the thermal insulator 106 being configured to at least partially extend over the clamp 103 when the attachment member 105 is assembled to the clamp 103.

The attachment member 105 is configured to be inserted in the axial direction into an opening defined by a band 107 of the clamp 103, so that attachment member 105 is disposed radially inside the clamp 103 in an assembled configuration. In the context of the present disclosure the clamp 103 is said to be in an assembled configuration when the free ends of the band 107 are joined by a fastener 109 of the clamp 103 to form a loop. One advantage, in particular, of the present disclosure, is that the heatshield 101 can be assembled to the clamp 103 while the free ends of the band 107 are attached to each other. In this manner, it is not necessary to separate the ends of the band 107 in order to assemble the heatshield 101 to the clamp 103. However, the heatshield 101 may be installed to the clamp 103 when the ends of the band 107 are separated and not joined by a fastener 109.

The attachment member 105 comprises a radially outer surface 111 configured to engage a radially inner surface 113 of the band 107 of the clamp 103, for example a clamping surface of the clamp 103. In this manner, the heatshield 101 is configured to be located coaxially with the clamp 103 when the clamp 103 is in an installed configuration, for example, when the clamp 103 is secured to a union between components, for example the flanged ends of two pipe sections.

Where the clamp 103 is a V-shaped clamp, the radially outer surface 111 of the attachment member 105 is inclined to the longitudinal axis A-A of the attachment member 105, so as to substantially engage an inclined, radially inner surface of the clamp 103. In another arrangement (not shown), the clamp 103 may be a standard type clamp comprising a flat band that forms a substantially cylindrical radially inner surface 113 when the clamp 103 is in an assembled configuration. As such, the attachment member 105 may comprise a correspondingly shaped radially outer surface 111 configured to engage the substantially cylindrical radially inner surface 113 of the clamp 103 when the clamp 103 is in an assembled configuration. Indeed, the attachment member 105 may have any appropriate form that allows the attachment member 105 to be assembled into the clamp 103 in the axial direction and to fit against the radially inner surface 113 of the clamp 103.

In one arrangement, the radially outer surface 111 of the attachment member 105 may be configured to substantially conform to the radially inner surface 113 of the clamp 103, for example by deformation of the attachment member 105 upon tightening the clamp 103. In this manner, the attachment member 105 is configured to transfer a clamp load generated by the clamp 103. It can been seen, therefore, that the portion of the attachment member 105 that extends under the clamp 103 in an assembled configured may be a load transfer portion 115 of the attachment member 105, since it is configured to transfer a clamp load of the clamp 103 to a union between components.

In the arrangement shown in FIGS. 1A to 2B, the attachment member 105 is shaped so that it extends circumferentially around the radially inner surface 113 of the clamp 103. For example, the attachment member 105 shown in FIGS. 1A to 2B extends continuously in the circumferential direction between first and second bosses 117a, 117b of the clamp 103. In this manner, the attachment member 105 is configured to evenly distribute the clamp load of the clamp 103 to a union between components when the clamp 103 is tightened. This is beneficial as attachment member 105, and thus the heatshield 101, does not generate a stress concentration underneath the clamp 103 when the clamp is tightened. However, in one or more other arrangements, the attachment member 105 may extend in a discontinuous manner around the radially inner surface 113 of the clamp 103. For example, the attachment member 105 may comprise a plurality of projections, for example tangs, that are configured to extend axially inwards underneath the clamping surface of the clamp 103. Thus, it can be seen that the action of tightening the clamp 103 around a union between components acts to secure the attachment member 105 within the clamp 103 by virtue of the clamp force, since the load transfer portion 115 of the attachment member 105 extends underneath the clamping surface of the clamp 103 in an assembled configuration.

The attachment member 105 may comprise a connecting portion 119 that extends away from the clamp 103 when the attachment member 105 is positioned inside the clamp 103, for example when the load transfer portion 115 is underneath the clamping surface of the clamp 103. In the arrangement shown in FIGS. 2A and 2B, the connecting portion 119 extends perpendicularly away from the clamp 103, so that a free end of the connecting portion 119 terminates away from an outer surface 121 of the clamp 103. However, the connecting portion 119 may extend in any appropriate direction. For example, the connecting portion 119 may extend away from the clamp 103 in an axial and/or a radial direction.

The connection portion 119 is configured to enable the thermal insulator 106 of the heatshield 101 to be secured to the attachment member 105. In the arrangement shown in FIGS. 1A to 2B, it would be difficult to secure the thermal insulator 106 directly to the load transfer portion 115, since the load transfer portion 115 is positioned under the clamping surface of the clamp 103 in an installed configuration. Thus, the connecting portion 119 extends away from the load transfer portion 115 in a manner suitable for securing the thermal insulator 106 to the attachment member 105.

In the arrangement shown in FIGS. 1A to 2B, the connecting portion 119 extends continuously around an axial edge of the load transfer portion 115. However, in one or more other arrangements, the connecting portion 119 may comprise one or more projections, that extend away from the clamp 103 when the attachment member 105 is positioned inside the clamp 103. Where the connecting portion 119 comprises a plurality of projections, each of the projections may extend in a different direction. It is to be understood that the connecting portion 119 may be of any appropriate form that allows the thermal insulator 106 to be coupled to the attachment member 105.

The thermal insulator 106 may comprise any appropriate material configured to limit the transfer of heat between the clamp 103 and the environment surrounding the clamp 103. For example, the thermal insulator 106 may comprise a woven/knitted fabric, such as Thermflex®. Additionally or alternatively, the thermal insulator 106 may comprise one or more rigid materials, such as a ceramic material. The thermal insulator 106 may be secured to the attachment member 105 using any appropriate securing means. For example, where the thermal insulator 106 comprises a woven/knitted fabric, the thermal insulator 106 may be stitched/tied to the attachment member 105. Where the thermal insulator 106 comprises a rigid material, such as a metallic material and/or a ceramic material, the thermal insulator 106 may be welded and/or glued to the attachment member 105 where appropriate. For example, the thermal insulator 106 may comprise a woven/knitted fabric portion that is attached to a carrier, such as a metallic and/or ceramic ring, and the carrier may be secured to the attachment member 105 in an appropriate manner.

In the arrangement shown in FIGS. 1A to 2B, the connecting portion 119 of the attachment member 105 comprises a plurality of openings 123 arranged towards the periphery of the connecting portion 119. The openings 123 comprise a plurality of through holes arranged circumferentially around the edge of the attachment member 105 that extends away from the clamp 103. However, the openings 123 may have any appropriate form. Where the thermal insulator 106 comprises a woven/knitted fabric, the thermal insulator 106 may be secured to the connecting portion 119 by virtue of one or more stitches through the openings 123. However, the openings 123 may be beneficial if the thermal insulator 106 is glued to the connecting portion 119, since the openings 123 act to increase the surface area to which an adhesive may adhere.

In the arrangement shown in FIGS. 2A and 2B, the thermal insulator 106 is configured to cover the radially outer surface of the clamp 103, whilst leaving the bosses 117a, 117b and the fastener 109 exposed. In this manner, the heatshield 101 does not interfere with the operation of the clamp 103, and does not block access to the fastener when tightening or loosening the clamp 103. However, in one or more other arrangements, the thermal insulator 106 may extend entirely around the circumference of the clamp 103 to cover the radially out surface and the fastening means 125 of the clamp 103. In one arrangement (not shown), the thermal insulator 106 may have an extension portion that is deployable from a body portion of the thermal insulator 106. The extension portion may be used to selectively cover/uncover the fastening means 125, when the heatshield 101 is assembled to the clamp 103.

The attachment member 105 may be configured to limit the amount by which the attachment member 105 may be inserted into the clamp 103. For example, in the arrangement shown in FIGS. 2A and 2B, the connecting portion 119 is configured to engage an axial end face of the clamp 103 to limit the amount by which the attachment member 105 may be inserted underneath the clamp 103. Additionally or alternatively, the load transfer portion 115 may be configured to engage a flange of a union between components, such as a flange of a turbocharger, to limit the amount by which the attachment member 105 may be inserted underneath the clamp 103.

In the arrangement shown in FIGS. 2A and 2B, the heatshield 101 comprises two attachment members 105. For example, the heatshield 101 comprises a first attachment member 105a, which is configured to be inserted axially into the clamp 103 in a first direction, and a second attachment member 105b configured to be inserted axially into the clamp 103 in a second direction that is opposite to the first direction. In other words, each of the attachment members 105a, 105b clip over respective axial end faces of the clamp 103. The thermal insulator 106 is connected to the first attachment member 105a and the second attachment member 105b, so that it extends axial over the radially outer surface of the clamp 103. However, in one or more other arrangements (not shown), the heatshield 101 may comprise a single attachment member 105, which may be assembled onto either of the axial end faces of the clamp 103. This may be beneficial in applications where there is limited space surrounding the clamp 103 when installed to a union between components.

Figure 3:
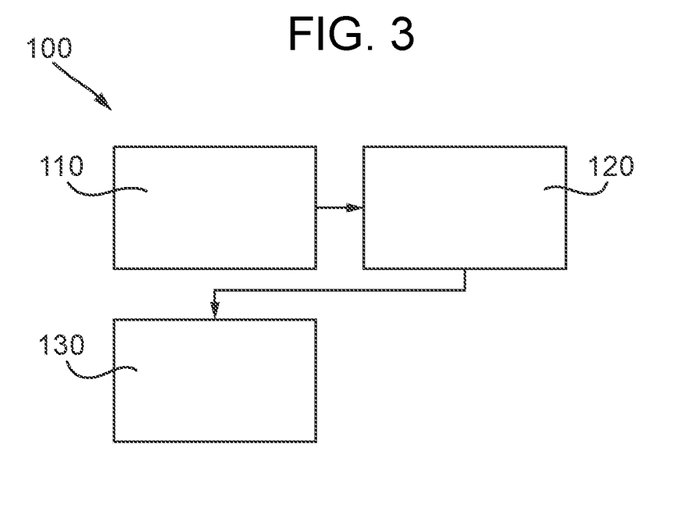
FIG. 3 shows a flowchart depicting a method of securing a heatshield to a clamp.

The present disclosure also provides a method 100 for assembling the heatshield 101 to the band clamp 103, as depicted by the flowchart of FIG. 3. However, the method 100 and below description merely serve as an example of how the heatshield 101 may be secured to the clamp 103, for example when it is determined that an existing clamp requires additional thermal protection, and the method of assembling the heatshield 101 to the clamp 103 is not limited to the steps shown in FIG. 3.

In one arrangement, the clamp 103 may already be installed to an engine. For example, the clamp 103 may be operable to secure the union between a pipe and the outlet of a turbo charger. The method 100 comprises a step 110 of loosening the clamp 103, for example using the fastening means 125, so that a radial clearance forms around the union between the pipe the turbocharger outlet. The size of the clearance depends on the configuration of the clamp 103. For example, the clamp 103 may be loosened by a sufficient amount to allow the attachment member 105 of the heatshield 101 to be inserted axially underneath the band 107 of the clamp 103. The method 100 comprises a step 120 of inserting axially the attachment member 105 under the band 107 of the clamp 103, for example until the connecting member 119 of the attachment member 105 engages the axial end face of the clamp 103. This ensures that the heatshield 101 is correctly positioned underneath the clamp 103. When installing the heatshield 101 shown in FIGS. 1A to 2B, the method 100 may comprise inserting axially the first attachment member 105 underneath one side of the clamp 103, and inserting axially the second attachment member 105b underneath the other side of the clamp 103. The method 100 comprises a step 130 of tightening the clamp to secure the heatshield 101 in place by virtue of a clamp load of the clamp 101. Thus, the method 100 results in attaching the heatshield 101 to the clamp 103 without having to remove the clamp 103 from the engine. However, it is to be understood that the clamp 103 need not be attached to the engine to install the heatshield 101. Indeed, the present disclosure provides a band clamp assembly, as shown in FIGS. 2A and 2B that may be installed directly to any appropriate components of an engine.

Figure 4:
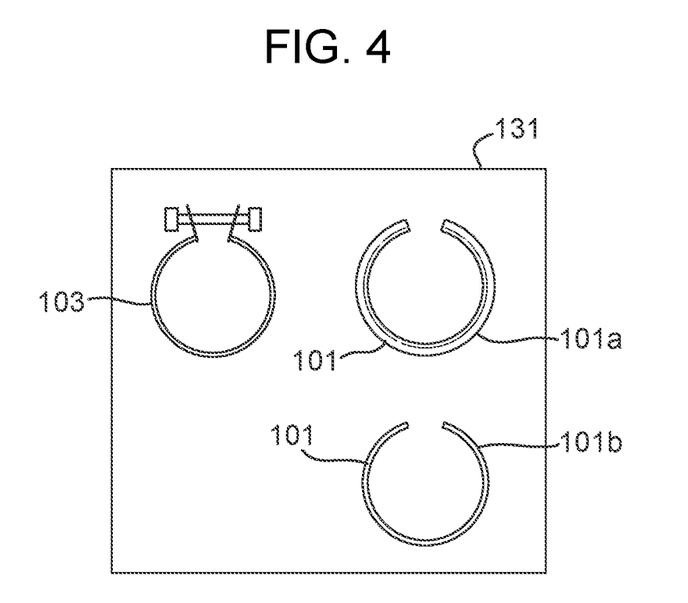
FIG. 4 shows a kit of band clamp components.

The present disclosure provides a kit 131 of band clamp components, as shown in FIG. 4. The kit 131 comprises one or more band clamps 103 and a plurality of the above described heatshields 101 each having a different thermal insulating capability. For example, the kit 131 may comprise a first heatshield 101a having a first thermal insulating capability, and a second heatshield 101b having a second thermal insulating capability different to the first thermal insulating capability of the first heatshield 101a. For example, the thermal conductivity and/or the emissivity of the first heatshield 101a may be greater or less than the thermal conductivity and/or the emissivity of the second heatshield 101b.

Figure 5:
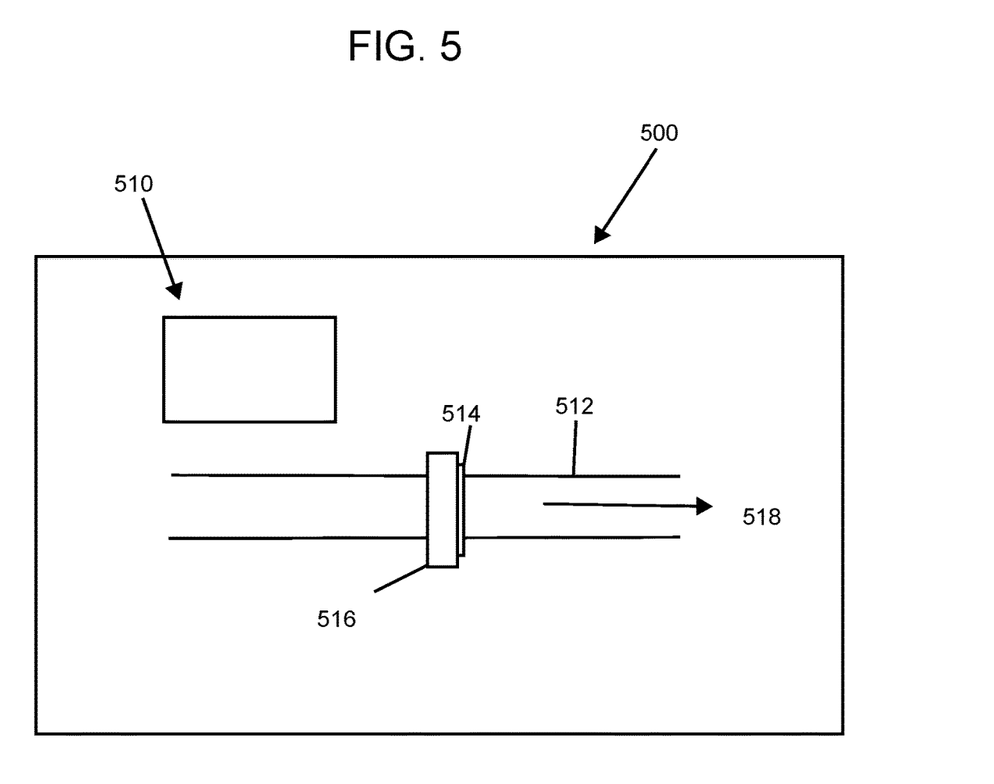
FIG. 5 is a schematic view of vehicle engine with a heat shield in an installed configuration.

FIG. 5 schematically shows a heatshield 516 in an installed configuration in a vehicle 500. The vehicle may be a naturally aspirated vehicle, a turbocharged vehicle, or hybrid electric vehicle, or a pure electric vehicle. The vehicle may include an engine (not shown) with a heat source, such as the heat source 510. The heat source may be a turbocharger. Optionally, the heat source may be an exhaust system, battery, or other components of the engine of the vehicle. Ducting 512 may be connected to the heat source. The ducting may be an outlet pipe connected to the outlet of a turbocharger, for example. Gas output from the turbocharger is represented by 518, flowing within the ducting 512. Band clamp 514 is shown connecting the ducting to an outlet pipe of the turbocharger. The band clamp 514 may be clamp 103 described and shown in FIGS. 1A-4. The clamp 514 is shown with the heatshield 516 installed. The heatshield 516 may be heat shield 101 described and shown in FIGS. 1A-4. Components of the heatshield arrangement shown in FIGS. 1A-4, while not shown in FIG. 5, are understood included in the installed arrangement of the heatshield 516. Heatshield 516 may include thermal insulator 106, connecting portion 119, fastener 109, attachment member 105, and load transfer portion 115, for example.

FIGS. 1A-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

The invention claimed is:

1. A heatshield for a band clamp, the heatshield comprising:
   an attachment member configured to be inserted axially into the clamp; and
   a thermal insulator secured to the attachment member, the thermal insulator being configured to at least partially extend over an outer surface of the clamp when the attachment member is inserted into the clamp, wherein the attachment member comprises one or more openings arranged circumferentially around a periphery of the attachment member, wherein the thermal insulator is secured to the attachment member by virtue of the one or more openings.

2. The heatshield according to claim 1, wherein the attachment member is configured to engage coaxially a clamping surface of the clamp.

3. The heatshield according to claim 1, wherein the attachment member comprises a load transfer portion configured to transfer a clamp load of the clamp when the heatshield is inserted into the clamp.

4. The heatshield according to claim 1, wherein the attachment member comprises a connecting portion that extends away from the clamp when the attachment member is inserted into the clamp.

5. The heatshield according to claim 4, wherein the thermal insulator is attached to the connecting portion of the attachment member.

6. The heatshield according to claim 1, wherein the thermal insulator is stitched and/or woven to the one or more openings of the attachment member.

7. The heatshield according to claim 1, wherein the attachment member is configured to engage an axial end face of the clamp.

8. The heatshield according to claim 1, wherein the attachment member is configured to be inserted into the clamp by a predetermined distance.

9. The heatshield according to claim 1, wherein the heatshield comprises a first attachment member configured to be inserted axially into the band clamp in a first direction, and a second attachment member configured to be inserted axially into the band clamp in a second direction that is opposite to the first direction.

10. The heatshield according to claim 9, wherein the thermal insulator is connected to the first attachment member and the second attachment member.

11. The heatshield according to claim 1, wherein the thermal insulation extends circumferentially around the clamp when the attachment member is inserted into the clamp.

12. The heatshield according to claim 11, wherein the thermal insulation extends partially around the circumference of the clamp when the attachment member is inserted into the clamp.

13. The heatshield according to claim 1, wherein the heatshield is configured to be secured to the clamp by a clamping force of the clamp in an installed configuration.

14. A kit of band clamp components, the kit comprising:
   one or more band clamps; and
   first and second heatshields each comprising:
      an attachment member configured to be inserted axially into the one or more clamps; and
      a thermal insulator secured to the attachment member, the thermal insulator being configured to at least partially extend over an outer surface of the one or more clamps when the attachment member is inserted into the one or more clamps, wherein a thermal insulating capability of the first heatshield is different to a thermal insulating capability of the second heatshield.

15. A method of securing a heatshield to a band clamp, the heatshield comprising:
   an attachment member configured to be inserted axially into the clamp; and
   a thermal insulator secured to the attachment member, the thermal insulator being configured to at least partially extend over an outer surface of the clamp when the attachment member is inserted into the clamp, wherein the attachment member comprises one or more openings arranged circumferentially around a periphery of the attachment member, wherein the thermal insulator is secured to the attachment member by virtue of the one or more openings, the method comprising:
      inserting axially the attachment member into the clamp; and tightening the clamp to secure the heatshield in place by virtue of a clamp load of the clamp.

* * * * *